(12) United States Patent
Su et al.

(10) Patent No.: US 8,821,032 B2
(45) Date of Patent: Sep. 2, 2014

(54) OPTICAL FIBER CONNECTOR AND ASSEMBLY TOOL FOR OPTICAL FIBER CONNECTOR

(75) Inventors: Bing Su, Shenzhen (CN); Po-Hsun Shen, New Taipei (TW); Jun-Jin Pan, Shenzhen (CN); Leland Wang, Santa Clara, CA (US)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 98 days.

(21) Appl. No.: 13/327,687

(22) Filed: Dec. 15, 2011

(65) Prior Publication Data

US 2013/0039630 A1    Feb. 14, 2013

(30) Foreign Application Priority Data

Aug. 11, 2011  (CN) .......................... 2011 1 0229904

(51) Int. Cl.
*G02B 6/36* (2006.01)
*G02B 6/38* (2006.01)

(52) U.S. Cl.
USPC .................... 385/62; 385/65; 385/81; 385/83

(58) Field of Classification Search
USPC .................................... 385/62, 65, 81, 83, 87
See application file for complete search history.

(56) References Cited

U.S. PATENT DOCUMENTS 6,379,052 B1 *   4/2002   de Jong et al. .................. 385/59

FOREIGN PATENT DOCUMENTS

CN           2163460 Y        4/1994

* cited by examiner

*Primary Examiner* — Omar Rojas
(74) *Attorney, Agent, or Firm* — Novak Druce Connolly Bove + Quigg LLP (57) ABSTRACT

An optical fiber connector includes an inner housing and a fixing module sleeved in the inner housing. The fixing module includes a support member and a fastening assembly fastened to the support member. The support member has a fixing portion, and the fixing portion defines a first restricting groove. The fastening assembly includes a fastener, a fixing member, an elastic member, and a pressing member. The fixing member defines a second restricting groove. The fastener sleeves on the fixing member and the elastic member. The fastener engages with the support member, and then the elastic member is resisted between the fixing member and the fastener, thereby generating an elastic force to drive the fixing member to abut against the fixing portion. The pressing member slidably engages with the support member and resists the fixing member.

19 Claims, 9 Drawing Sheets

OPTICAL FIBER CONNECTOR AND ASSEMBLY TOOL FOR OPTICAL FIBER CONNECTOR

BACKGROUND

1. Technical Field

The present disclosure generally relates to optical fiber connectors, and particularly to an optical fiber connector that can conveniently assemble optical fiber to the optical fiber connector.

2. Description of the Related Art

As the Fiber To The Home (FTTH) is widely used in communication field, many optical fiber connectors are needed for connecting the optical fiber. An optical fiber connector generally has an optical fiber holder and a clamp sleeve sleeved on the optical fiber holder. A clamp force of the optical fiber holder can be adjusted by sliding the clamp sleeve on the optical fiber holder. However, the clamp sleeve should be driven to slide repeatedly on the optical fiber holder when assembling the optical fiber, thus it is inconvenient for use. Furthermore, the clamp sleeve and the optical fiber holder may undergo wear and tear due to the sliding of the clamp sleeve, therefore, the optical fiber cannot be positioned accurately.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
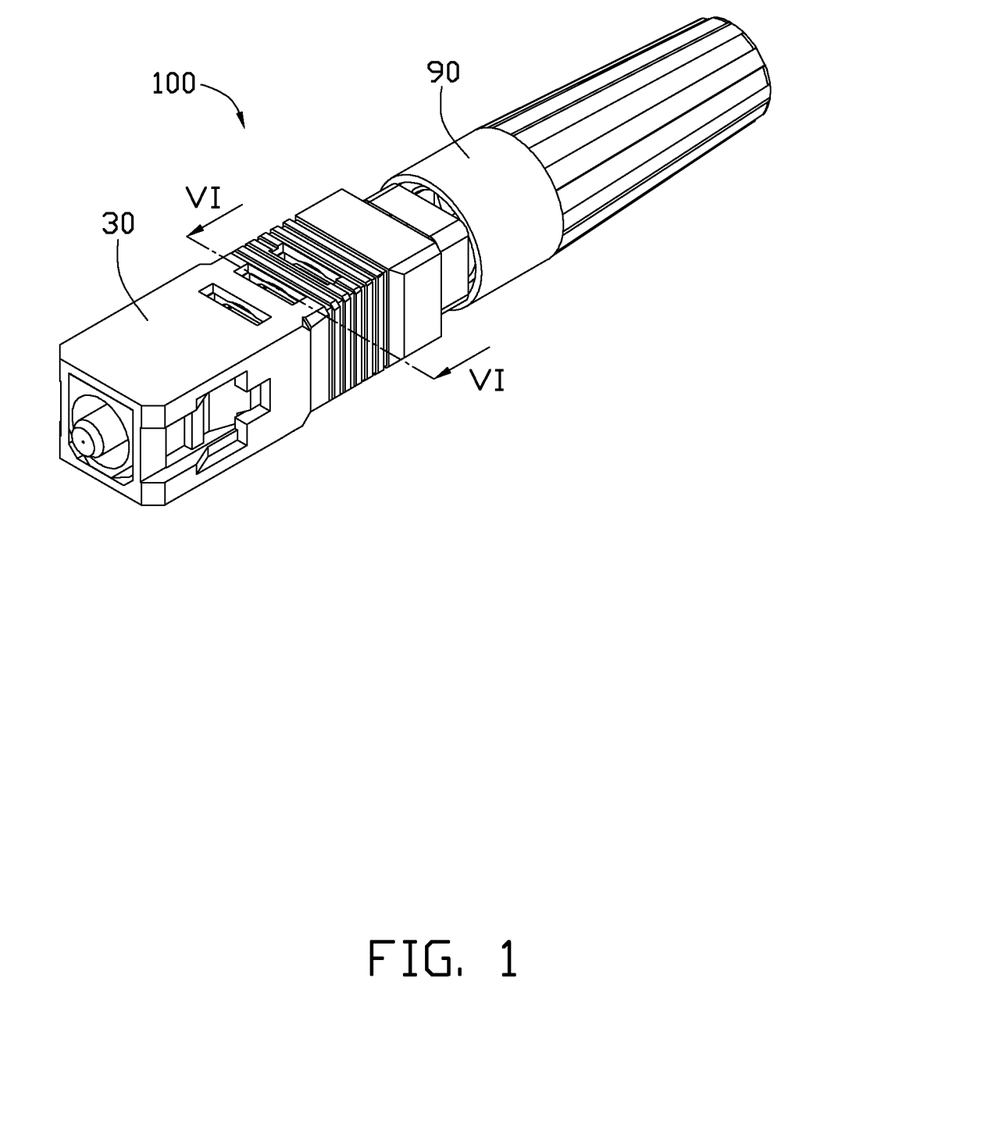
FIG. 1 is an isometric, assembled view of an embodiment of an optical fiber connector.
Figure 2:
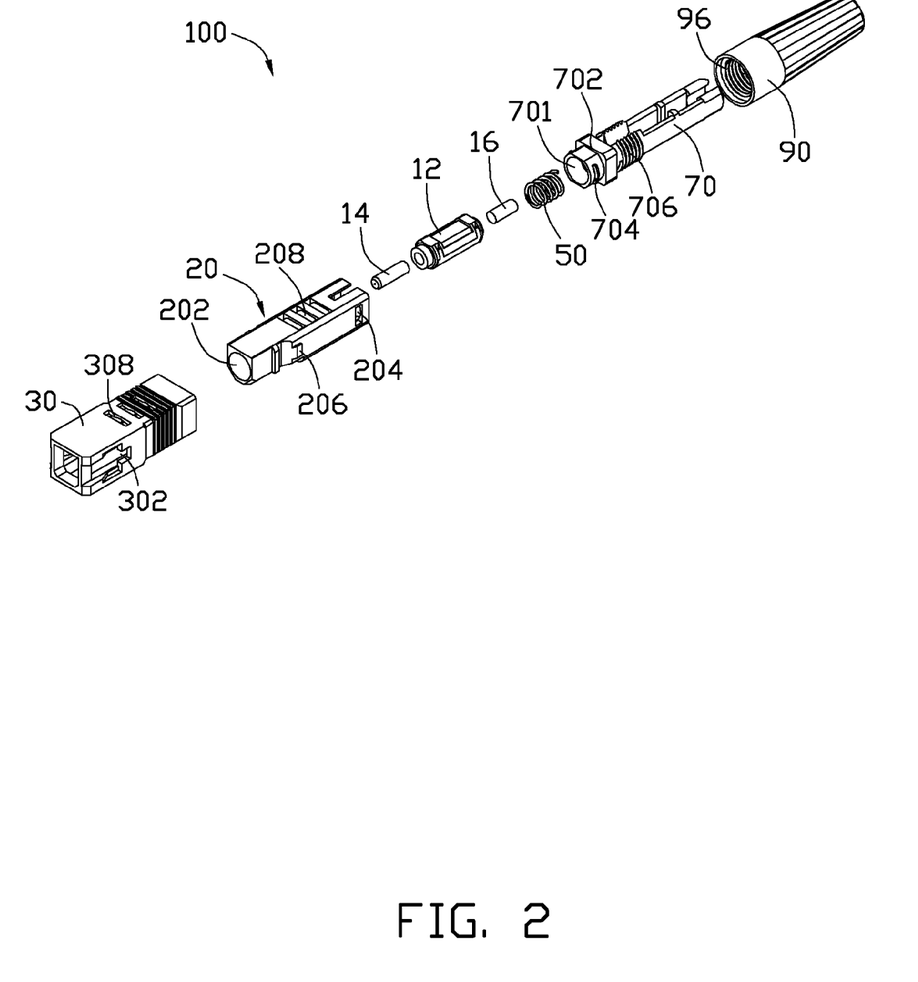
FIG. 2 is an exploded, isometric view of the optical fiber connector of FIG. 1, including a fixing module.

Referring to FIGS. 1 and 2, an embodiment of an optical fiber connector 100 includes a fixing module 12, an optical fiber ferrule 14 positioned on an end of the fixing module 12, a fixing sleeve 16 positioned on the other end of the fixing module 12, an inner housing 20 sleeved on the fixing module 12, an outer housing 30 sleeved on the inner housing 20, a resilient member 50, a resisting member 70, and an end sleeve 90 sleeved on the resisting member 70. In an illustrated embodiment, the optical fiber connector 100 is Subscriber Connector (SC) optical fiber connector.

Figure 3:
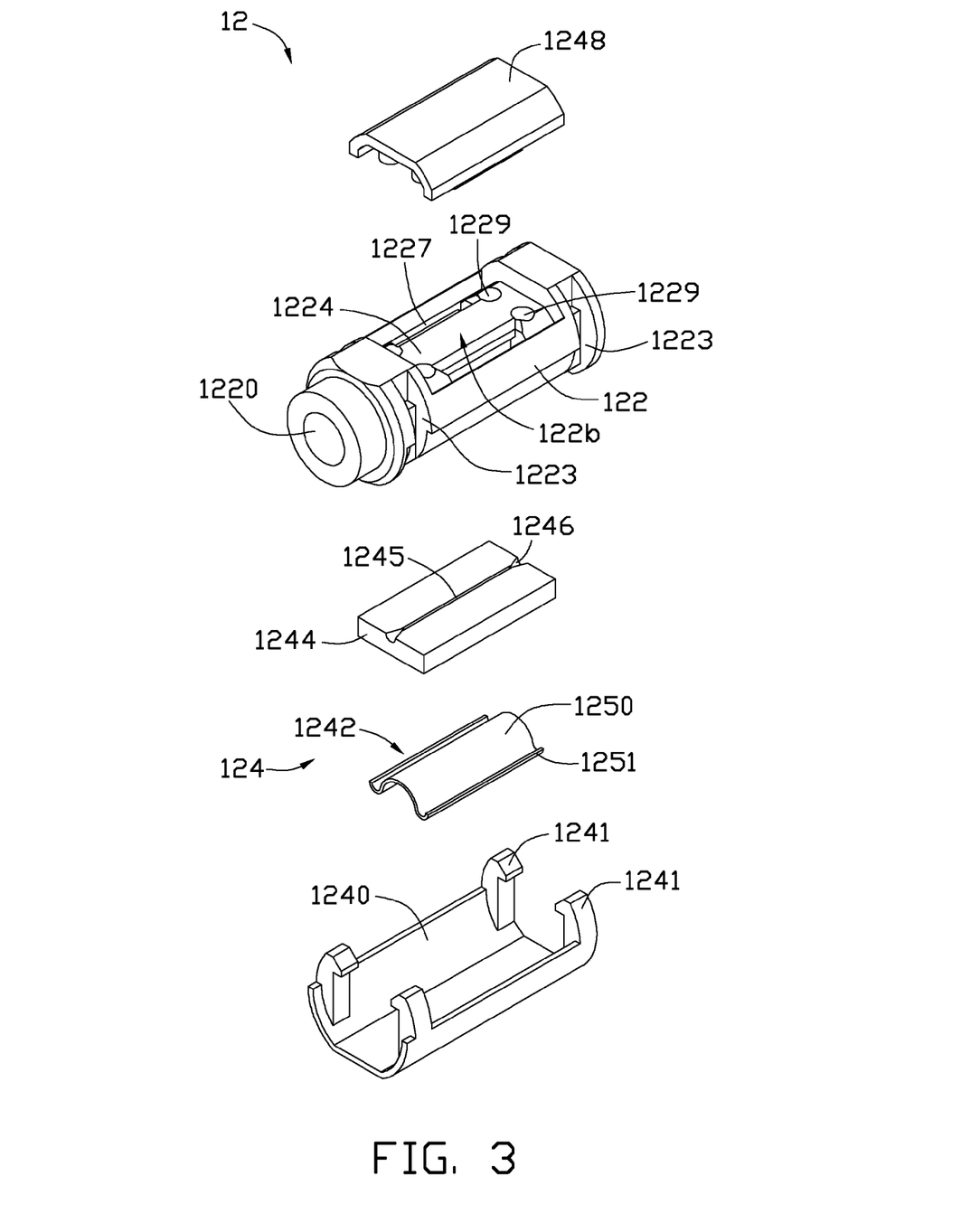
FIG. 3 is an exploded, isometric view of the fixing module of FIG. 2.
Figure 4:
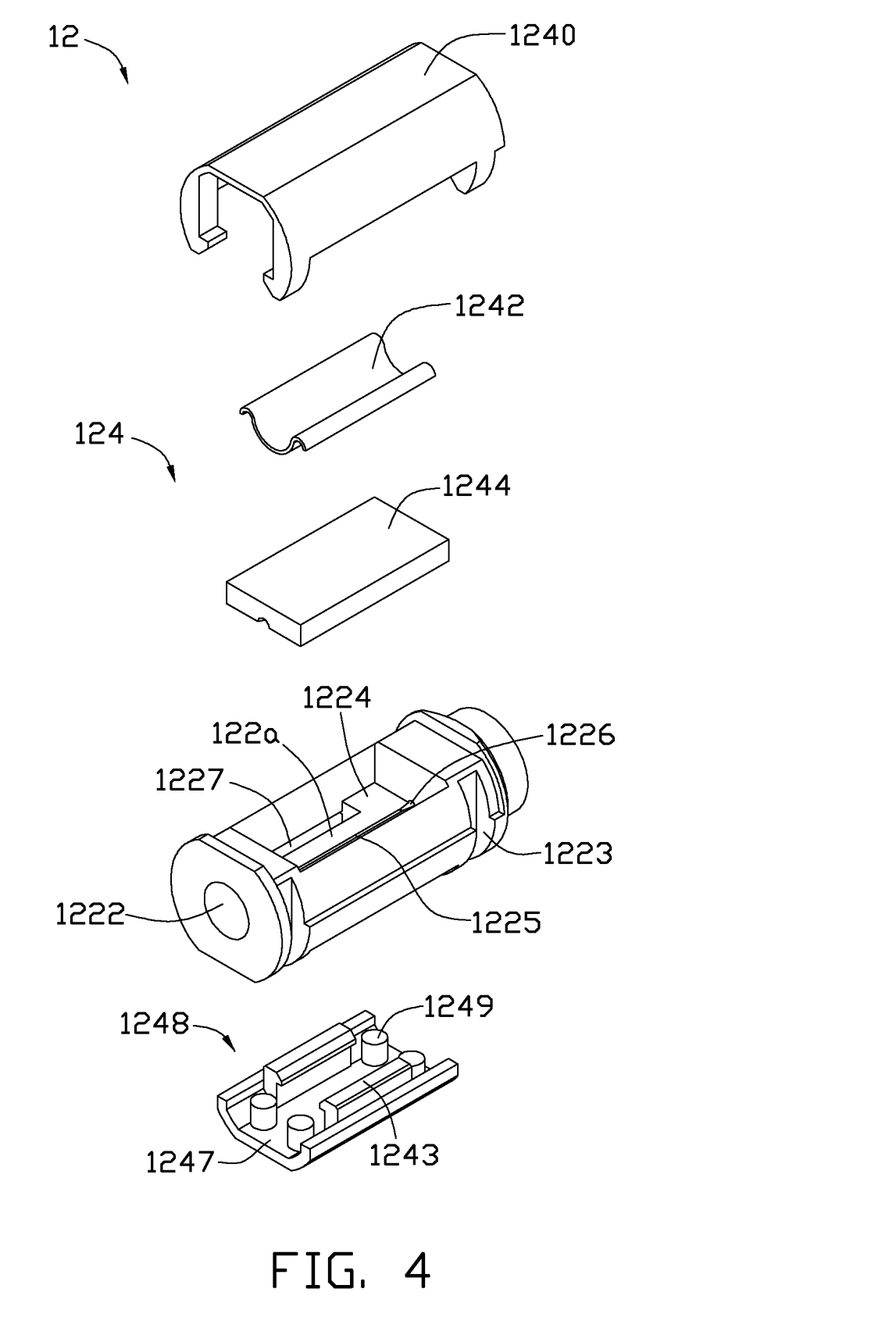
FIG. 4 is similar to FIG. 3, but viewed from another aspect.

Referring to FIGS. 3 and 4, the fixing module 12 includes a support member 122 and a fastening assembly 124. The support member 122 is substantially cylindrical, and connects the optical fiber ferrule 14 to an insert optical fiber (not shown). The support member 122 defines a first connecting hole 1220 for receiving the optical fiber ferrule 14 in an end, and a second connecting hole 1222 for receiving the fixing sleeve 16 in the other end. The support member 122 further defines two annular positioning grooves 1223 on opposite ends. A fixing portion 1224 is formed on the support member 122 between the positioning grooves 1223. The fixing portion 1224 has a first surface 122a and a second surface 122b opposite to the first surface 122a. The fixing portion 1224 defines a first restricting groove 1225 in the first surface 122a for positioning the inserted optical fiber. In the illustrated embodiment, the first restricting groove 1225 is V-shaped, and communicates from the first connecting hole 1220 to the second connecting hole 1222. Two guide grooves 1226 are formed on opposite ends of the first restricting groove 1225, such that the optical fiber is easily inserted into the first restricting groove 1225. The fixing portion 1224 further defines two fixing grooves 1227 on opposite sides, which are parallel to an axis of the fixing portion 1224. Two pairs of limiting grooves 1229 are defined in the second surface 122b, and each pair of the limiting grooves 1229 are adjacent to one corresponding fixing groove 1227. In an alternative embodiment, the first restricting groove 1225 is arc-shaped, and the guide grooves 1226 may be omitted.

The fastening assembly 124 includes a fastener 1240, an elastic member 1242, a fixing member 1244, and a pressing member 1248. The fastener 1240 is substantially U-shaped, and made of elastic materials, such as plastic. Four fastening arms 1241 extend from an edge of the fastener 1240, respectively, and engage in the corresponding positioning grooves 1223 of the support member 122.

The elastic member 1242 is received in the fastener 1240, and includes an arched main portion 1250 and two arched support portions 1251 formed on opposite sides of the main portion 1250. The main portion 1250 abuts against the fixing member 1244. The elastic member 1242 can also be a spring or a spring washer positioned between the fastener 1240 and the fixing member 1244.

The fixing member 1244 is a rectangular plate, and fixes the inserted optical fiber together with the fixing portion 1224. The fixing member 1244 defines a second restricting groove 1245 corresponding to the first restricting groove 1225 of the fixing portion 1224. The second restricting groove 1245 is substantially V-shaped. Two guide grooves 1246 are defined on opposite ends of the second restricting groove 1245. The fixing member 1244 is received in the fastener 1240, and positioned between the elastic member 1242 and the fixing portion 1224. The second restricting groove 1245 and the first restricting groove 1225 cooperatively form a positioning hole 126 (see FIG. 7) for receiving the inserted optical fiber. In the alternative embodiment, the second restricting groove 1245 is arc-shaped, and the guide grooves 1246 may be omitted.

The pressing member 1248 is arched, and a top of which forms a flat plate 1247. Two hook portions 1243 are formed on opposite sides of the flat plate 1247, and can engage in the fixing grooves 1227 of the fixing portion 1224. The pressing member 1248 further forms four limiting protrusions 1249 adjacent to the hook portions 1243 and corresponding to the limiting grooves 1229 of the support member 122. A height of the limiting protrusions 1249 is less than that of the hook portions 1243.

Referring again to FIG. 2, the inner housing 20 sleeves on the fixing module 12. The inner housing 20 defines a stepped hole 202 in an end, and two positioning grooves 204 opposite to each other in the other end thereof. Two connecting portions 206 are formed on a middle portion of a side wall of the inner housing 20. A top wall of the inner housing 20 defines a plurality of insert grooves 208. In the illustrated embodiment, the inner housing 20 defines three insert grooves 208.

The outer housing 30 sleeves on the inner housing 20, and defines two connecting grooves 302 corresponding to the connecting portions 206. A top wall of the outer housing 30 defines a plurality of insert grooves 308. In the illustrated embodiment, the outer housing 30 defines three insert grooves 308.

The resilient member 50 is a compression spring in the embodiment. The resisting member 70 axially defines a stepped hole 701 in a proximal end thereof adjacent to the fixing module 12. Two positioning portions 704 opposite to each other are formed on an outer surface of the proximal end of the resisting member 70. The resisting member 70 further forms a threaded portion 706 in the middle thereof, and a flange 702 between the threaded portion 706 and the positioning portion 704. The end sleeve 90 defines a threaded hole 96 corresponding to the threaded portion 706 at an end, and a through hole (not shown) communicating with the threaded hole 96 at the other end thereof.

Figure 5:
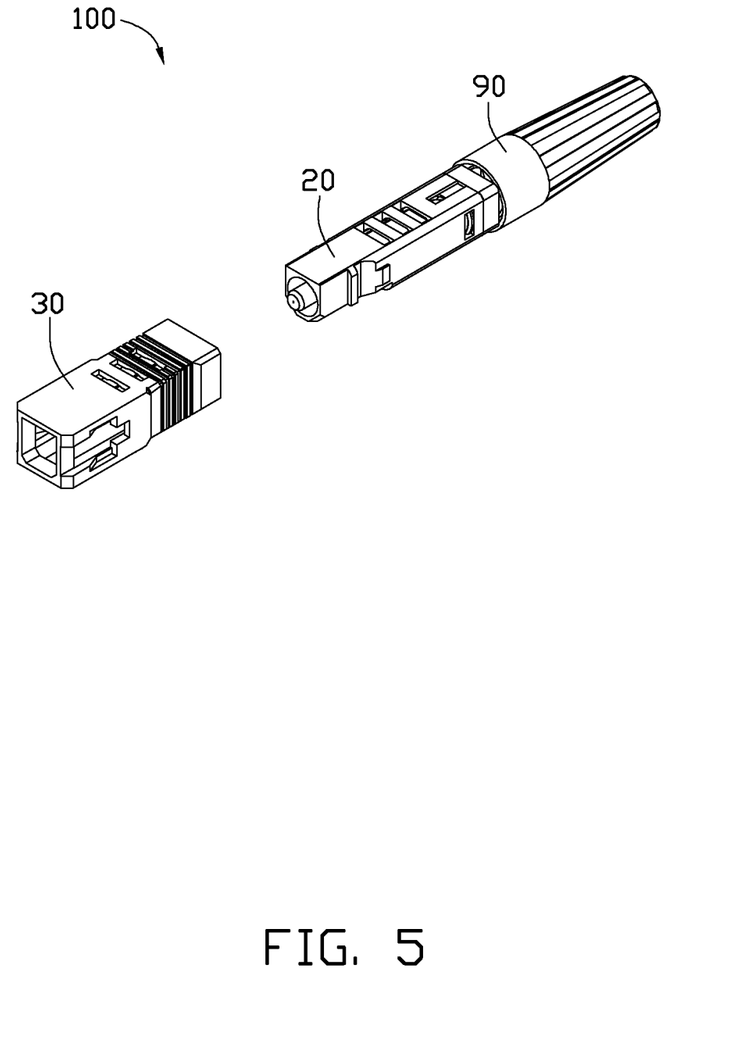
FIG. 5 is another exploded, isometric view of the optical fiber connector of FIG. 1.

Referring to FIG. 5, in assembly of the optical fiber connector 100, the optical fiber ferrule 14 and the fixing sleeve 16 are positioned on opposite ends of the fixing module 12. The fixing module 12 is received in the inner housing 20, with the pressing member 1248 facing the insert grooves 208 of the inner housing 20. The resilient member 50 sleeves on the fixing sleeve 16. The resisting member 70 is engaged with the inner housing 20, and the resilient member 50 is inserted in the stepped hole 701 of the resisting member 70, and the positioning portions 704 engage in the positioning grooves 204. The resilient member 50 is then compressed between the fixing module 12 and the resisting member 70. The outer housing 30 sleeves on the inner housing 20, with the connecting portions 206 engaging in the connecting grooves 302 of the outer housing 30, and then the insert grooves 308 are aligned with the insert grooves 208. The threaded portion 706 of the resisting member 70 engages into the threaded hole 96 of the end sleeve 90.

Figure 6:
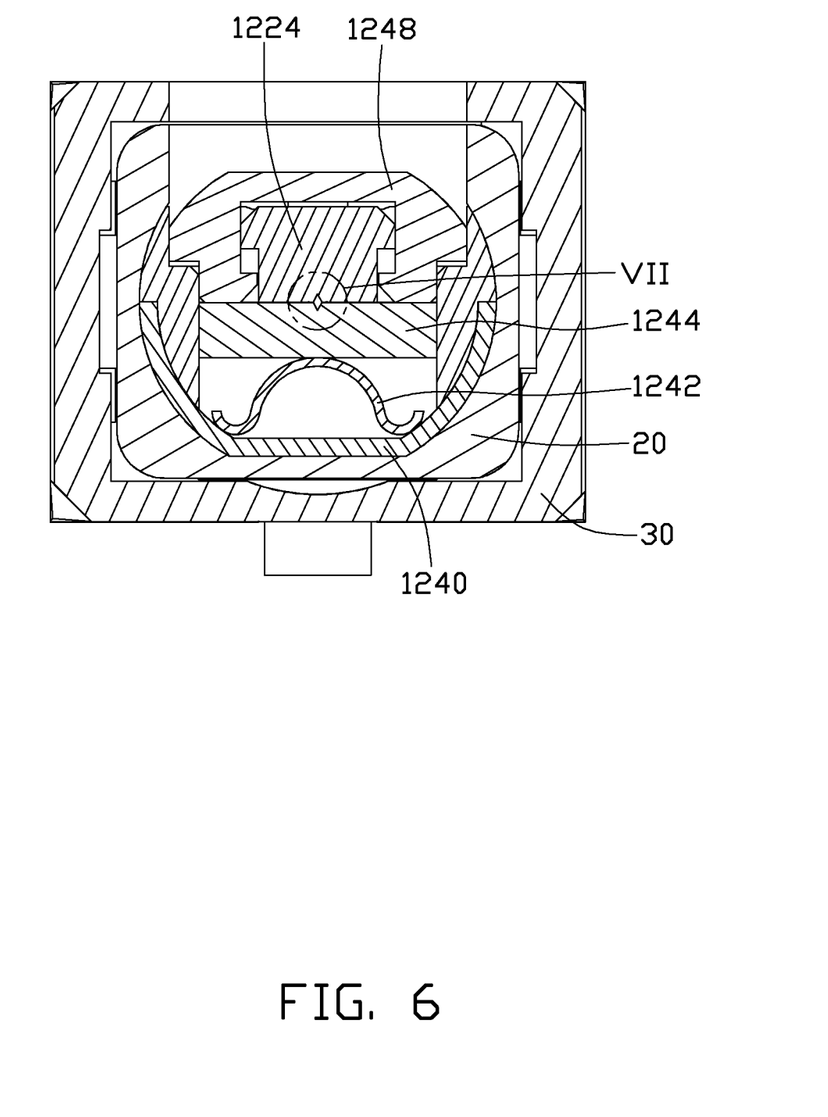
FIG. 6 is a cross-sectional view of the optical fiber connector of FIG. 1 taken along the line VI-VI.
Figure 7:
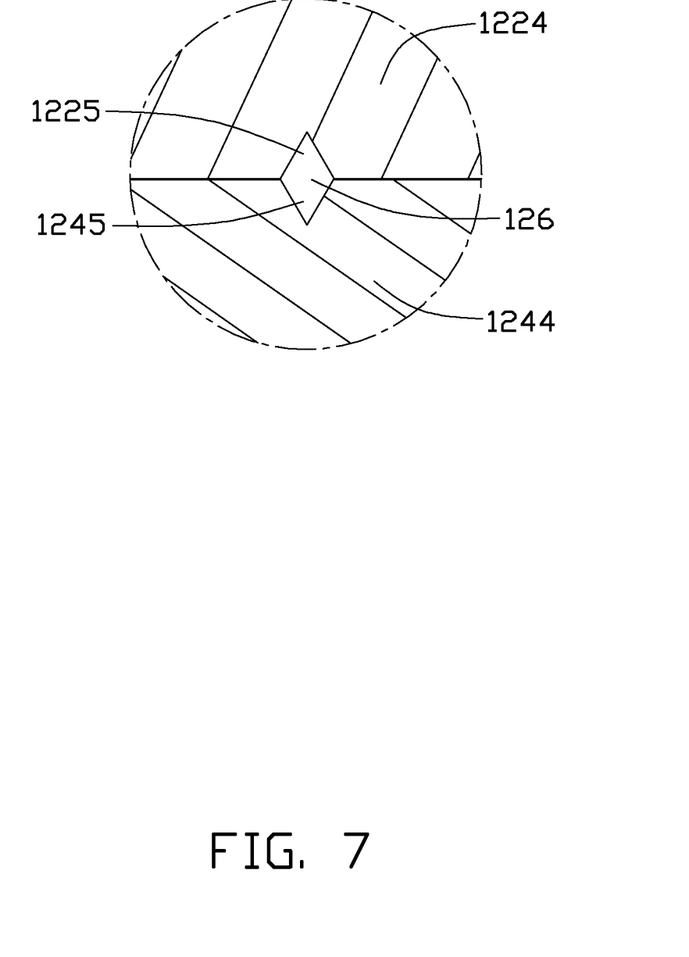
FIG. 7 is an enlarged view of a region VII of FIG. 6.

Referring to FIGS. 6 and 7, after the optical fiber connector 100 is assembled, the fixing module 12 is positioned in the inner housing 20. The fastener 1240 is engaged with the support member 122. The elastic member 1242 and the fixing member 1244 are positioned between the fastener 1240 and the fixing portion 1224 of the support member 122. The elastic member 1242 is resisted between the fixing member 1244 and the fastener 1240. Therefore, the fixing member 1244 abuts against the fixing portion 1224, such that the first restricting groove 1225 and the second restricting groove 1245 cooperatively form the positioning hole 126 for receiving the inserted optical fiber.

Figure 8:
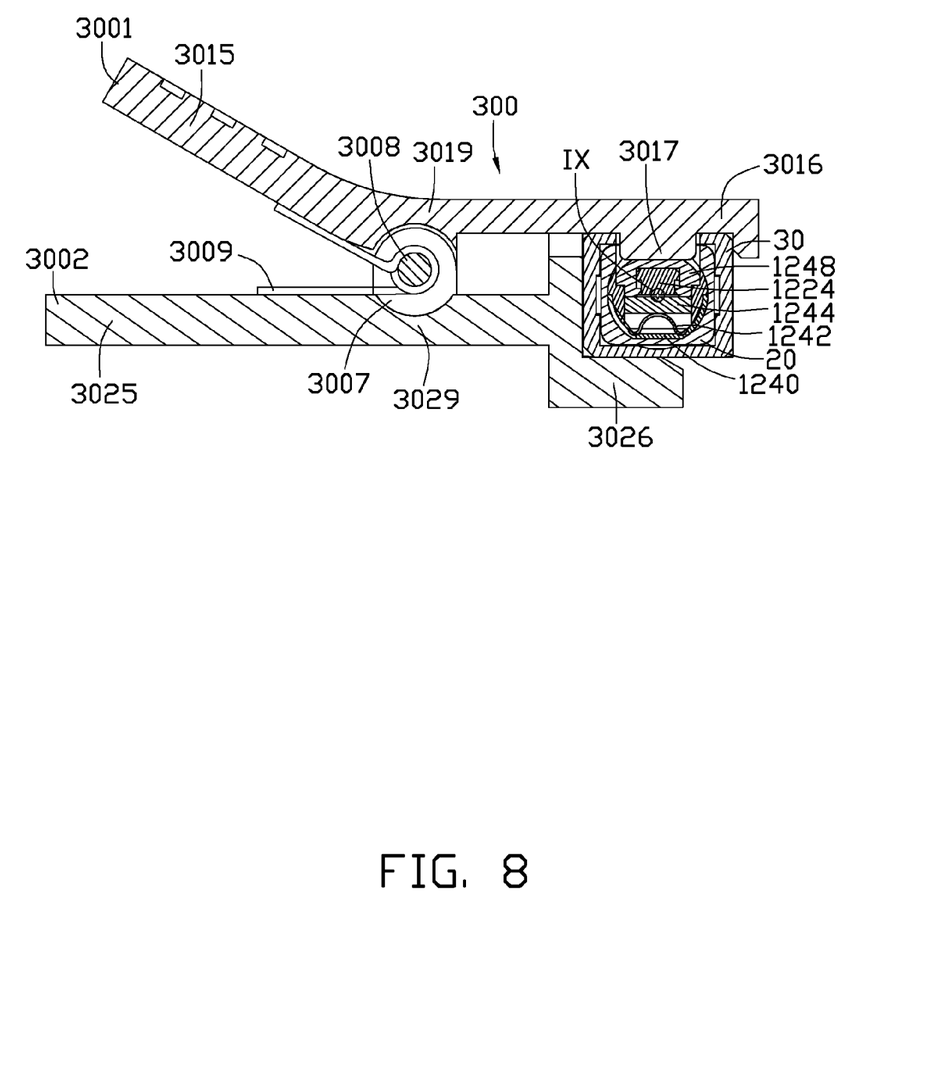
FIG. 8 is a cross-sectional view of the optical fiber connector of FIG. 6 being clamped by an assembly tool.
Figure 9:
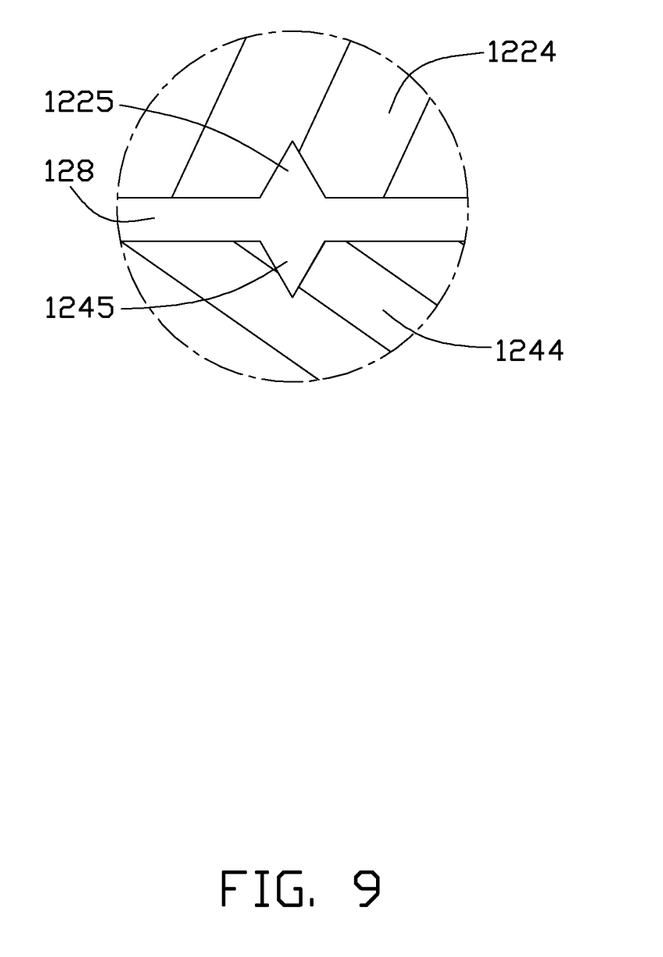
FIG. 9 is an enlarged view of a region IX of FIG. 8.

Referring to FIGS. 8 and 9, in assembly the inserted optical fiber to the optical fiber connector 100, an assembly tool 300 is provided. The assembly tool 300 includes a first clamp arm 3001, a torsion spring 3007, a pivot shaft 3008, and a second clamp arm 3002. The first clamp arm 3001 includes a first operating portion 3015, a first clamp portion 3016, and a first connecting portion 3019 connecting the first operating portion 3015 and the first clamp portion 3016. The second clamp arm 3002 includes a second operating portion 3025, a second clamp portion 3026, and a second connecting portion 3029 connecting the second operating portion 3025 and the second clamp portion 3026. The torsion spring 3007 sleeves on the pivot shaft 3008, and the pivot shaft 3008 rotatably connects the first connecting portion 3019 to the second connecting portion 3029. The torsion spring 3007 has two resisting ends 3009 respectively resisting the first operating portion 3015 and the second operating portion 3025. The first clamp portion 3016 forms a press protrusion 3017 towards the second clamp portion 3026.

In use, the outer housing 30 is grasped between the first clamp portion 3016 and the second clamp portion 3026. The press protrusion 3017 extends through the insert groove 308 and the insert groove 208, and presses the pressing member 1248 to move towards the fastener 1240 until the limiting protrusions 1249 engage in the limiting grooves 1229 of the fixing portion 1224, therefore, a gap 128 is generated between the fixing portion 1224 and the fixing member 1244 (as shown in FIG. 9), and the elastic member 1242 is deeply compressed to generated a resilient force. Then, the optical fiber is inserted into the optical fiber connector 100, and received in the second restricting groove 1245. The inserted optical fiber is optically coupled to the optical fiber ferrule 14.

When the optical fiber connector 100 is detached from the assembly tool 300, the resilient force of the elastic member 1242 drives the fixing member 1244 to move towards the fixing portion 1224, until the fixing member 1244 abuts against the fixing portion 1224 again. Thus, the inserted optical fiber is restricted in the positioning hole 126 (see FIG. 7).

In assembly the inserted optical fiber to the optical fiber connector 100, an operator only needs to press the pressing member 1248, and to insert the optical fiber to the optical fiber connector 100. The optical fiber connector 100 then automatically clamps the optical fiber. Therefore, the optical fiber connector 100 is convenient for usage for assembling the optical fiber, and has higher assembly precision.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. An optical fiber connector for fixing optical fiber comprising:
   an inner housing; and
   a fixing module sleeved in the inner housing, the fixing module comprising:
      a support member having a fixing portion, and the fixing portion defines a first restricting groove; and
      a fastening assembly fastened to the support member, wherein the fastening assembly comprises a fastener, a fixing member, an elastic member, and a pressing member; the fixing member defines a second restricting groove; the fastener sleeves on the fixing member and the elastic member, the elastic member is positioned between the fastener and the fixing member; the fastener engages with the support member, and the elastic member is resisted between the fixing member and the fastener, thereby generating an elastic force to drive the fixing member to abut against the fixing portion, such that the second restricting groove and the first restricting groove cooperatively form a positioning hole for positioning the optical fiber; the pressing member slidably engages with the support member and resists the fixing member.

2. The optical fiber connector of claim 1, wherein the support member defines a plurality of positioning grooves; the fastener form a plurality of fastening arms, and engage in the positioning grooves of the support member.

3. The optical fiber connector of claim 1, wherein the elastic member comprises an arched main portion and two arched support portion formed on opposite sides of the main portion; the main portion resists the fixing member, and the support portion resists the fastener.

4. The optical fiber connector of claim 1, wherein the fixing portion defines a plurality of fixing grooves; the pressing member forms a plurality of hook portions, and the hook portions slidably engage in the fixing grooves of the fixing portion.

5. The optical fiber connector of claim 4, wherein the pressing member forms a plurality of limiting protrusions, a height of the limiting protrusions is less than that of the hook portions.

6. The optical fiber connector of claim 1, further comprising an optical fiber ferrule and a fixing sleeve positioned on opposite sides of the support member.

7. The optical fiber connector of claim 1, further comprising an outer housing sleeved on the inner housing, wherein the inner housing defines a plurality of insert grooves, the outer housing defines a plurality of insert grooves, and the insert grooves of the outer housing are aligned with the insert grooves of the inner housing.

8. The optical fiber connector of claim 7, further comprising a resilient member, a resisting member, and an end sleeve sleeved on the resisting member, wherein the end sleeve engages with the resisting member, and the resilient member is compressed between the resisting member and the support member.

9. The optical fiber connector of claim 1, wherein the fixing portion further defines a guide groove at an end, and the guide groove communicates with the first restricting groove.

10. An optical fiber connector for fixing optical fiber comprising:
   a housing; and
   a fixing module sleeved in the housing, the fixing module comprising:
      a support member having a fixing portion;
      a fastener engaging with the support member;
      a fixing member positioned between the fastener and the support member;
      an elastic member is resisted between the fastener and the fixing member, thereby generating an elastic force to drive the fixing member to abut against the fixing portion, such that the fixing member and the fixing portion clamp the optical fiber; and
      a pressing member slidably engages with the support member and resists the fixing member, wherein the support member defines a plurality of positioning grooves; the fastener form a plurality of fastening arms, and engage in the positioning grooves of the support member.

11. The optical fiber connector of claim 10, wherein the elastic member comprises an arched main portion and two arched support portion formed on opposite sides of the main portion; the main portion resists the fixing member, and the support portion resists the fastener.

12. The optical fiber connector of claim 10, wherein the fixing portion defines a plurality of fixing grooves; the pressing member forms a plurality of hook portions, and the hook portions slidably engage in the fixing grooves of the fixing portion.

13. The optical fiber connector of claim 12, wherein the pressing member forms a plurality of limiting protrusions, a height of the limiting protrusions is less than that of the hook portions.

14. The optical fiber connector of claim 10, further comprising an optical fiber ferrule and a fixing sleeve positioned on opposite sides of the support member.

15. The optical fiber connector of claim 10, further comprising an outer housing sleeved on the housing, wherein the housing defines a plurality of insert grooves, the outer housing defines a plurality of insert grooves, and the insert grooves of the outer housing are aligned with the insert grooves of the housing.

16. The optical fiber connector of claim 15, further comprising a resilient member, a resisting member, and an end sleeve sleeved on the resisting member, wherein the end sleeve engages with the resisting member, and the resilient member is compressed between the resisting member and the support member.

17. The optical fiber connector of claim 10, wherein the fixing portion defines a first restricting groove, and the fixing member defines a second restricting groove; the second restricting groove and the first restricting groove cooperatively form a positioning hole for positioning the optical fiber.

18. An optical fiber connector for fixing optical fiber comprising:
   a housing; and
   a fixing module sleeved in the housing, the fixing module comprising:
      a support member having a fixing portion;
      a fastener engaging with the support member;
      a fixing member positioned between the fastener and the support member;
      an elastic member is resisted between the fastener and the fixing member, thereby generating an elastic force to drive the fixing member to abut against the fixing portion, such that the fixing member and the fixing portion clamp the optical fiber; and
      a pressing member slidably engages with the support member and resists the fixing member, wherein the fixing portion defines a plurality of fixing grooves; the pressing member forms a plurality of hook portions, and the hook portions slidably engage in the fixing grooves of the fixing portion.

19. The optical fiber connector of claim 18, wherein the pressing member forms a plurality of limiting protrusions, a height of the limiting protrusions is less than that of the hook portions.

* * * * *